Patented Mar. 5, 1929.

1,704,410

UNITED STATES PATENT OFFICE.

CURT STEDEFELD, OF HEIDELBERG, GERMANY.

METHOD OF WELDING RAIL JOINTS.

No Drawing. Application filed June 22, 1927, Serial No. 200,770, and in Germany June 28, 1926.

For the welding of rail-joints the method of welding electrically and the butt-welding method by means of thermite have proved to be particularly useful. With these methods the rail ends are heated to welding heat in a very short time, and under the existing conditions the heat is also conducted away in a comparatively short time, the rails cooling down, therefore, correspondingly quickly. The texture at the place of welding shows, therefore, when investigated metallographically, the coarse texture indicating superheating, in consequence whereof the joints welded according to one or the other of the two methods stated are, as regards the essential strength properties materially inferior to a joint in which the metal has retained its original fine texture. This is true especially of the notched bar impact test strength at low temperatures. The impact strength however is especially important for the durability of welded rail-joints. Disruptions of the continuity at the place of welding are nearly unavoidable, although the disruptions may be very slight and may exist only at the bordering zones, or may consist in small amounts of slag enclosed in the metal, but such places are sufficient to produce a notched-effect by reason of the continually repeated alternating bending strains to which the rail is subjected by the loads rolling along above it.

An additional point is that most tracks are located in regions where it is more or less severely cold in winter-time which is in itself a cause of reducing the impact strength of the steel relatively to that existing in the summer. These conditions are the chief causes for the large number of fractures of welded rail-joints especially in cold weather, whereas hitherto the fractures were ascribed to the tensile strain arising at low or very low temperatures in the track, rails of which are welded on a long track without any formation of joints.

The discovery disclosed in the preceding paragraphs forms the basis of the present invention which relates to a method of doing away completely with the drawbacks of the methods practiced hitherto. By the researches of F. Körber and A. Pomp ("Mitteilungen aus dem Kaiser-Wilhelm-Institut für Eisenforschung"=Communications from the Emperor William Institute for Iron Investigation, Volume VI, section 5, page 33, and Volume VII, section 4, page 43, of which extracts have been published in the "Zeitschrift des Vereins Deutscher Ingenieure"= Journal of the Society of German Engineers, 1925, page 1308, and 1926, page 546), concerning the influence of the preliminary treatment upon the tenacity of ingot steel in the cold and hot it has been proved that the same ingot steel when so treated as to show a fine grain or texture possesses many times the impact strength as measured by the energy of impact, per unit of sectional area needed to cause fracture, that it possesses when overheated. For instance, at a temperature of $-30°$ C. the impact strength of the treated structure, according to the sort of the steel, is from about three to fifteen times as great as that of the overheated grain or texture, that is to say, the most important cause of fractures can be diminished to from 1/3 to 1/15 of what it was hitherto by improving the quality of the steel at the joint according to the present invention.

The most perfect method for attaining this result, as regards steel, consists in first hardening and then annealing the steel at a definite (annealing) temperature; this procedure must well be distinguished from the mere cooling without any consideration of the refinement of the grain or texture, as already made use of in the case of certain machine or engine repairs (but not with rails) in order to remove internal strains. Refining the rail-joint in the manner and for the purpose stated can be carried out for instance, as follows: First, heating the place of welding above the uppermost critical point of conversion, 700°–900° C. according to the kind of steel, for instance by means of electric heating elements laid around it preferably in the manner practiced with the open incandescent electric furnace, and second, quenching the place of welding by means of oil or by water-sprays, and third, reheating it to a definite temperature and cooling it down in the air or by means of warm oil or water according to the kind of steel. The refining process can be modified, of course, in various ways. In the case of electric resistance welding of the rail ends, the hardening heat of the place of welding could, for instance, be generated also with the aid of the welding apparatus itself directly after to the welding process, as might be done also as regards the subsequent annealing heating. It is essential in all cases only that the coarse-grained overheated texture of the place of welding is converted into a refined fine-grained texture without gross discontinuities in the texture when passing to the unchanged material of the rails.

The temperature to which the material is reheated for this purpose must be, as is well known, below the upper conversion point of the particular steel used, the temperature to which the weld is heated being in general about 550 to 700° C.

For example, with a steel containing 0.51% carbon, 0.19% silicon and 0.82% manganese, the steel may be quenched in oil at 750° C. and reheated to 580–600° C. and allowed to cool. The impact strength of the welded joint is in this case increased nearly six fold. With a steel containing 0.83% carbon, 0.29% silicon, 0.60% manganese, 0.14% nickel and 0.12% chromium, the steel may be quenched in oil at 850° C., reheated to 630–640° C., allowed to cool to 600° C. in the furnace or its equivalent and from 600° C in the open air. In this case the impact strength of the welded joint is increased nearly three fold.

Another remarkable advantage of the above improved treatment resides also in the approximately equal resistibility of the surface of the places of welding and of the rails with respect to wear and tear by the vehicle wheels; this high degree of resistibility is also important as regards the life of welded rail-joints.

I claim:

1. Process of treating welded rail-joints which comprises heating the weld above the upper critical temperature of the steel, quenching and annealing from a temperature below the upper critical temperature of the steel.

2. Process of treating welded rail-joints which comprises heating the weld above the upper critical temperature of the steel, quenching, reheating to a temperature below the upper critical temperature of the steel, and cooling.

In testimony whereof I affix my signature.

CURT STEDEFELD.